3,755,382
SYNTHESIS OF 17α-(TRIMETHYLSILYL-ETHYNYL)ESTRADIOL
David F. Crowe, San Jose, and Masato Tanabe, Palo Alto, Calif., assignors to Stanford Research Institute, Menlo Park, Calif.
No Drawing. Filed June 1, 1972, Ser. No. 258,505
Int. Cl. C07c 169/08
U.S. Cl. 260—397.5      25 Claims

ABSTRACT OF THE DISCLOSURE

Disclosed as new compounds having estrogenic and antifertility activity are derivatives of estradiol which are substituted in the 17α position by hydrocarbylsilylvinyl or hydrocarbylsilylethynyl groups, representative new compounds being 17α(triethylsilylethynyl)estradiol, 17α-(cis - 2′ - triethylsilylvinyl)estradiol, 17α(trans-2′-triethylsilylvinyl)estradiol and 17α(1′-tri-n-propysilylvinyl)estradiol.

---

The invention herein described was made in the course of or under contract with the National Institutes of Health, Department of Health, Education and Welfare.

SUMMARY OF THE INVENTION

This invention relates to novel hydrocarbylsilylethynyl and hydrocarbylsilylvinyl derivatives of estradiol having the structure,

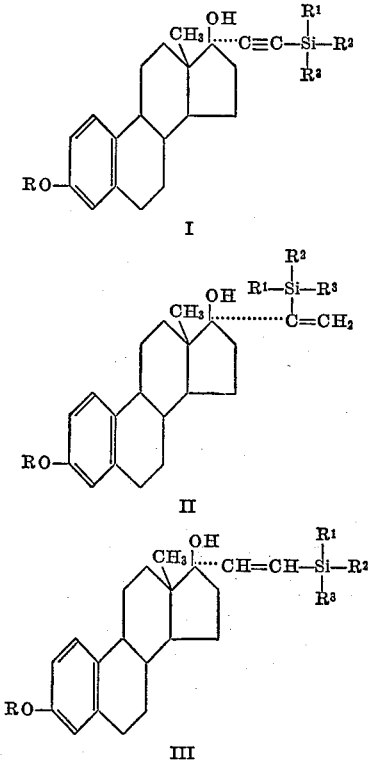

including both trans-2′ and cis-2′ isomers wherein R represents hydrogen, $CH_3$ or alkanoyl, and $R^1$, $R^2$ and $R^3$, which may be the same or different, represent hydrocarbyl groups which can be alkyl, alkenyl, alkaryl, aryl or aralkyl groups.

As employed herein, "alkyl" includes monovalent radicals of branched- or straight-chain configuration such as methyl, ethyl, n-butyl, isobutyl, hexyl, 2-ethylhexyl, octyl, dodecyl, hexadecyl, and octadecyl. It also includes cycloalkyl radicals such as cyclobutyl, cyclopentyl and cyclohexyl, as well as divalent alkylene groups such as trimethylene, butylene and hexylene wherein the one group satisfies two of the adjacent $R^1$, $R^2$, or $R^3$, radicals by forming a silicon-carbon ring. However, lower alkyl groups of from 1 to about 7 carbon atoms such as methyl, ethyl, propyl, isopropyl, butyl, isobutyl, tert-butyl, pentyl, neopentyl, hexyl, isohexyl and heptyl constitute a preferred class from which to constitute $R^1$, $R^2$ and $R^3$. "Alkanoyl" includes acyl radicals of lower ($C_2$–$C_7$) alkanoic acids, e.g. acetyl, propionyl, butyryl and heptanoyl.

Suitable alkenyl groups from which to constitute one or more of the $R^1$, $R^2$, $R^3$ groups include vinyl, isopropenyl, propenyl, allyl, methallyl, and the several butenyl, pentenyl and hexenyl groups, for example, while representative aryl, alkaryl and aralkyl groups which may be employed include phenyl, tolyl, xylyl, naphthyl, benzyl and phenylethyl, for example.

The compounds of the present invention range from white crystal solids having well defined melting points to heavy viscous fluids. They are soluble in organic solvents such as tetrahydrofuran, ethanol, acetone and dioxane, and are almost insoluble in water. These compounds possess estrogenic and antifertility activity, and are especially interesting since there is evidence that by employing these compounds a useful separation of contraceptive from estrogenic activity can be achieved.

The silylethynyl derivatives of Formula I above can be prepared by a general route in which ethynylestradiol is converted to the bromo-magnesiumacetylide by reaction with ethylmagnesium bromide in tetrahydrofuran. The acetylide compound is then reacted with the desired chlorosilane compound, following which the ether linkages in the resulting compound are then cleaved by mild acid hydrolysis to yield the desired final product. A typical reaction sequence, leading to the production of 17α(triethylsilylethynyl)estradiol, is as follows:

Equation 1

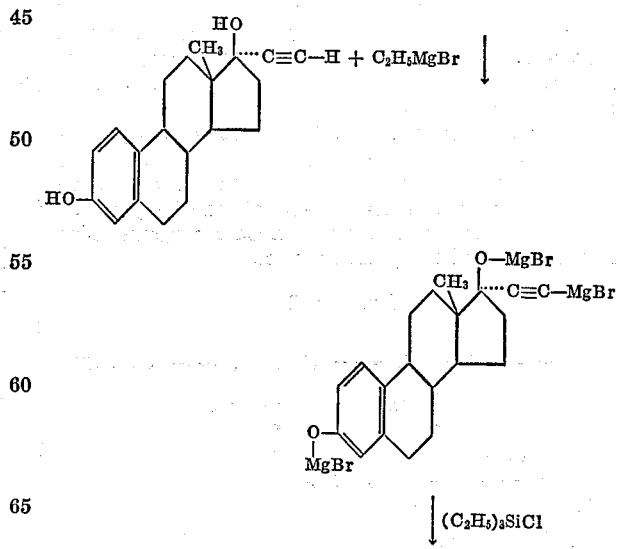

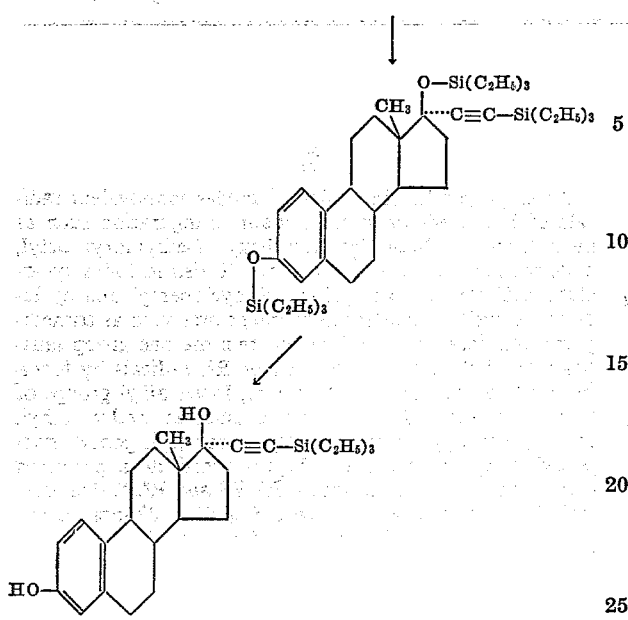

In a typical preparation, the starting compound is reacted with ethylmagnesium bromide in tetrahydrofuran at 60° C. for 2 hours. Thereafter, the chlorosilane reactant is added to the reaction mixture which is then heated at 60° C. for a period of from about 10 to 20 hours. Water is then added to dissolve inorganic salts present, following which the aqueous phase is removed and the balance of the mixture is dried over anhydrous sodium sulphate. The solvent present is then removed at reduced pressures on a steam bath to afford the residue which is then taken up in 95% methanol. A small, catalytic amount of hydrogen chloride is added and the mixture is then stirred for approximately 2 hours at room temperature to effect cleavage of the ether bonds. The methanol is then removed at reduced pressures as the material is maintained on a steam bath. The desired compound is recovered from the residue by recrystallization from an appropriate solvent such as mixed ethyl ether-hexane.

In many cases, particularly when using $C_3$ and higher $R^1$, $R^2$ and $R^3$ groups, the hydroxyl groups of the starting compound are preliminarily blocked by reacting the compound with dihydropyran in the presence of p-toluenesulfonic acid and in a benzene solvent medium. Following this reaction step, which is effected at moderately elevated temperatures over the course of several hours, the benzene solvent is taken off under reduced pressures on a steam bath and the product is reacted with ethylmagnesium bromide in tetrahydrofuran in accordance with the reaction sequence shown above.

The foregoing general procedure of Equation 1 permits of ready variation of the silicon substituents by use of the appropriate chlorosilane reactant. Many of these compounds are readily available, and all can be prepared from silicon tetrachloride and Grignard reagents using the following typical equation system.

Equation 2

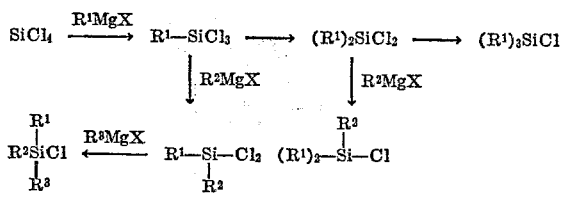

The silylvinyl derivatives of Formula II above and the corresponding trans-silylvinyl derivatives of Formula III are the joint reaction products obtained by the platinum-catalyzed addition of the appropriate hydrosilane compound ($HSiCl_3$, $HSiClR^1R^2$, $HSiR^1R^2R^3$, or the like) to the ethynyl group of ethynylestradiol. This reaction proceeds at 150° C. in a sealed reaction vessel using a diglyme solvent. The two products can be separated from one another by conventional chromatographic and solvent extraction procedures. When using a silyl reactant containing one or more chlorine atoms, said atoms may be replaced by the desired $R^1R^2$ or $R^3$ groups by reaction with the Grignard reagent of choice. In this method, no blocking of functional groups in the ethynyl estradiol starting material is required.

The cis-2' silylvinyl derivatives of Formula III can be prepared by the selective hydrogenization of the triple bond in the corresponding silylethynylestradiol compounds. They also can be prepared by the free radical-catalyzed addition to silicon hydride ($HSiCl_3$, $HSiR^1Cl_2$, etc.) to the ethynylestradiol starting material. This reaction proceeds, for example, as the reaction mixture is heated in the presence of benzoyl peroxide.

Description of prepared embodiments

The following examples are illustrative of the invention but are not to be construed as limiting.

EXAMPLE 1

17α(trimethylsilylethynyl)estradiol

In this operation, 5 grams of ethynylestradiol are admixed with 125 ml. tetrahydrofuran and 20 ml. of methylmagnesium bromide and refluxed for 2 hours. After cooling, 20 ml. of trimethylchlorosilane in 60 ml. tetrahydrofuran are added to the reaction mixture which is then heated at 60° C. for 16 hours. After cooling, there is added 250 ml. of ethyl ether, following which the reaction mixture is water washed several times to remove inorganic salts which are present. The washed material is then dried over anhydrous sodium sulphate, following which the solvent present is removed on a steam bath at reduced pressures. The residue is dissolved in 225 ml. of 95% methanol, and to the solution there is added 50 ml. of water and 0.5 ml. of concentrated hydrochloric acid. This mixture is stirred at room temperature for 2 hours, following which the solvent and the hydrochloric acid are removed on a steam bath at reduced pressures. The remaining material is crystallized from methylene chloride, thereby recovering a white crystalline material having a melting point of 174–175° C. and an $[\alpha]_D$ —26° ($CHCl_3$). This material is identified as the captioned compound by nuclear magnetic resonance (NMR) and infrared (IR) methods of analysis. This analysis is confirmed by quantitative analysis which shows the compound to contain 74.93% carbon and 8.57% hydrogen, as against theoretical values of 74.95% and 8.73% for these elements.

EXAMPLE 2

17α(trimethylsilylethynyl)estradiol 3-methyl ether

This operation is conducted in accordance with the general procedure of Example 1 except that there the starting material employed is ethynylestradiol 3-methyl ether, and ethylmagnesium bromide is substituted for the methylmagnesium bromide of said Example 1. Here the white crystalline product obtained, which is identified by NMR and IR analysis as the captioned compound, has a melting point of 83–87° C. Elemental analysis show it to contain 72.53% carbon and 9.40% hydrogen versus theoretical amounts of 72.79% and 9.89% for these elements.

EXAMPLE 3

17α(triethylsilylethynyl)estradiol

This operation is conducted in accordance with the general procedure of Example 2 except that ethynylestradiol and triethylchlorosilane are used as reactants. The crystalline product obtained, which is identified as the captioned compound by NMR and IR analysis, has a melting point of 170–172° C. It is found to contain 76.03% carbon and 9.38% hydrogen, as against theoretical amounts of 76.06% and 9.33% for these elements.

EXAMPLE 4

17α(tri-n-propylsilylethynyl)estradiol

This operation is conducted in accordance with the general procedure of Example 2 except that the silane reactant is tri-n-propylchlorosilane, and the final product is obtained by recrystallization from a mixed ethyl ether-hexane solvent. The white crystalline product so obtained, which is identified as the captioned compound by NMR and IR analysis, has a melting point of 96–98° C. It is found to contain 77.03% carbon and 9.68% hydrogen, as against theoretical values of 76.95% and 9.80% for these elements.

EXAMPLE 5

17α(tri-n-butylsilylethynyl)estradiol
17α(tri-n-butylsilylethynyl)estradiol 3-acetate This operation is conducted in accordance with the general procedure of Example 2 except that the silane employed is tri-n-butylchlorosilane and the final (3-acetate) product is obtained by recrystallization from hexane. Here the 17α(tri-n-butylsilylethynyl)estradiol obtained on distilling off the solvent is not a solid but a clear, gum-like viscous fluid. It is converted into its 3-acetate derivative by reacting 0.8 g. of the viscous residue with 2 ml. of acetic anhydride in 5 ml. pyridine, the reaction proceeding as the mixture is left at room temperature overnight. The solvent and residual anhydride are then removed at reduced pressures over a steam bath, with the resulting 3-acetate product, identified by NMR and IR analysis, being recovered by recrystallization from hexane as a white crystalline material having a melting point of 84–86° C. It is found to contain 76.33% carbon and 9.67% hydrogen, as against theoretical values of 76.08% and 9.76% for these elements.

EXAMPLE 6

17α(triphenylsilylethynyl)estradiol

The operation of Example 2 is repeated except that as the starting compound there is employed an ethynylestradiol wherein both —OH groups have been blocked with tetrahydropyranyl ether linkages. Further, the crystalline product, identified as the captioned compound by NMR and IR analysis, is recovered from a mixed ethyl ether-hexane solvent and has a melting point of 123–125° C. It is found to contain 82.04% carbon and 7.10% hydrogen, as against theoretical values of 82.28% and 6.90% for these elements.

EXAMPLE 7

17α(cyclopentamethylenemethylsilylethynyl)estradiol

This operation is conducted in accordance with the general procedure given above in Example 2 except that as the silane reactant there is employed cyclopentamethylene-methylchlorosilane. The resulting crystalline product, identified as the captioned compound by NMR and IR analysis, has a melting point of 174-175° C. It is found to contain 76.45% carbon and 8.91% hydrogen as against theoretical values of 76.43% and 8.98% for these elements.

EXAMPLE 8

17α(dimethylphenylsilylethynyl)estradiol

This operation is conducted in accordance with the general procedure of Example 2 except that here there is employed as the silane reactant dimethylphenylchlorosilane, and the crystalline product is obtained by a recrystallization from a mixed ethyl ether-hexane solvent. This product which is identified as the captioned compound by NMR and IR analysis is found to have a melting point of 122–1260° C.

EXAMPLE 9

17α(dimethylallylsilylethynyl)estradiol

This operation is conducted in accordance with the general procedure of Example 2 except that here the silane reactant employed is dimethylallylchlorosilane. NMR and IR analysis confirm that the crystalline product obtained corresponds to the captioned compound which is found to have a melting point of 151–153° C.

EXAMPLE 10

17α(trans-'-triethylsilylvinyl)estradiol
17α(1'-triethylsilylvinyl)estradiol In this operation, 8.5 g. of ethynylestradiol are admixed with 150 ml. of diglyme, 3.3 g. triethylsilane and 0.2 g. of a catalyst made up of 5% platinum deposited on carbon. This reaction is heated with stirring in a sealed vessel at 160° C. for 16 hours. The resulting material is cooled and filtered through Celite to remove the catalyst, the Celite then being washed with 100 ml. of chloroform. The filtrate and chloroform wash are combined and heated on a steam bath at reduced pressures to remove the solvent. The residue chromotographs on 250 g. of neutral silica gel, followed by elution with 5 liters of benzene, yield 5 g. of a pure compound which is identified by NMR and IR methods of analysis as 17α(trans-2'-triethylsilylvinyl)estradiol. This compound, a white crystalline solid, has a melting point of 122–126° C. and a $[\alpha]_D$ +65 ($CHCl_3$). It is found to contain 75.85% carbon and 9.65% hydrogen, as against theoretical amounts of 75.67% and 9.77% of these elements.

Further elution with 5 liters of benzene containing 2.5% ethyl ether yields 4.5 g. of a pure compound identified by NMR and IR analysis as 17α(1-triethylsilylvinyl)estradiol. This crystalline compound has a melting point of 175–176° C. and $[\alpha]_D$ +24 ($CHCl_3$).

EXAMPLE 11

17α(trans-2'-trimethylsilylvinyl)estradiol
17α(1'-trimethylsilylvinyl)estradiol The procedure of Example 10 is repeated except that the product work-up is one wherein the pure 17α(trans-2'-trimethylsilylvinyl)estradiol is recovered by recrystallization from methylene chloride. This compound, identified by NMR and IR analysis, has a melting point of 195–198° C. It is found to contain 75.85 carbon and 9.61% hydrogen, as against theoretical amounts of 74.56% and 9.25% for these elements.

A sample of the residue from the crystallization of the trans-2' compound was separated on eight 8 x 8-inch x 1-mm. Si–GF plates. Development with benzene containing 25% ethyl ether and elution with chloroform-methanol afforded the pure compound 17α(1'trimethylsilylvinyl)estradiol, identified by NMR and IR analysis. The crystalline product has a melting point of 188–190° C. and is found to contain 75.02% carbon and 9.50% hydrogen, as against theoretical values of 74.56% and 9.25% of these elements.

EXAMPLE 12

17α(trans-2'-tri-n-propylsilylvinyl)estradiol
17α(1'-tri-n-propylsilylvinyl)estradiol This operation is conducted in accordance with the general method of Example 9 except that here the silane material employed is tri-n-propylsilane. The 17α(trans-2'-tri-n-propylsilylvinyl)estradiol, identified by NMR and IR methods of analysis, is a crystalline material having a melting point of 106–109° C. The 17α(1'-tri-n-propylsilylvinyl)estradiol, identified by NMR and IR analysis, is a crystalline product with a melting point of 140–143° C.

EXAMPLE 13

17α(trans-2'-tri-n-butylsilylvinyl)estradiol

17α(1'-tri-n-butylsilylvinyl)estradiol

This operation is conducted in accordance with the general method of Example 9 except that here the silane material employed is tri-n-butylsilane. The 17α(trans-2'-tri-n-butylsilylvinyl)estradiol, identified by NMR and IR methods of analysis, is a crystalline material having a melting point of 88–90° C. It is found to contain 77.44% carbon and 10.54% hydrogen, as against theoretical values of 77.34% and 10.44% of these elements. The 17α(1'-tri-n-butylsilylvinyl)estradiol identified by NMR and IR analysis, is a viscous oil with a molecular weight of 496.

EXAMPLE 14

17α(trans-2'-triphenylsilylvinyl)estradiol

17α(1'-triphenylsilylvinyl)estradiol

This operation is conducted in accordance with the general method of Example 9 except that here the silane material employed is triphenylsilane. The 17α(trans-2'-triphenylsilylvinyl)estradiol, identified by NMR and IR methods of analysis, is a crystalline material having a melting point of 136–138° C. The 17α(1'-triphenylsilylvinyl)estradiol, identified by NMR and IR analysis, is a crystalline product with a melting point of 142–144° C. It is found to have a molecular weight of 556.

EXAMPLE 15

17α(cis-2'-triethylsilylvinyl)estradiol

In this operation, 0.4 g. of the compound of Example 3 (17α(triethylsilylethynyl)estradiol), along with 20 ml. of 95% ethanol and 25 mg. of a catalyst made up of palladium on barium sulphate, are hydrogenerated for 24 hours under atmospheric pressure and at room temperature. The catalyst is then removed from the reaction mixture by filtration through Celite. The filtrate is then freed of solvent by evaporation on a steam bath under reduced pressures. The desired product is isolated by thin-layer chromatography with benzene containing 15% ethyl ether to develop the plates, followed by elution with chloroform-methanol to yield 80 mg. of a material, identified by NMR and IR as the captioned compound. This compound has a melting point of 127–129° C. and is found to contain 75.49% carbon and 9.64% hydrogen, as against theoretical values of 75.68% and 9.77% of these elements.

EXAMPLE 16

17α(cis-2'-trimethylsilylvinyl)estradiol

The procedure of Example 15 is substantially repeated, but with the use of the compound of Example 1 being used as the starting material. Here the crystalline product obtained, identified by NMR and IR analysis as the captioned compound, has a melting point of 105–107° C. and is found to contain 74.42% carbon and 9.29% hydrogen, as against theoretical values of 74.54% and 9.25% of these elements.

EXAMPLE 17

17α(trans-2'-cyclopentamethylenesilylvinyl)estradiol

17α(1'-cyclopentamethylenemethylsilylvinyl)estradiol

This operation is conducted in accordance with the general method of Example 9 except that here the silane material employed is cyclopentamethylenemethylsilane. The 17α(trans - 2' - cyclopentamethylenemethylsilylvinyl)estradiol, identified by NMR and IR methods of analysis, is a crystalline material having a melting point of 183–185° C. The 17α(1'-cyclopentamethylenemethylsilylvinyl)estradiol, identified by NMR and IR methods of analysis, is a crystalline product having a melting point of 173–175° C.

EXAMPLES 18–22

In accordance with the general method recited in Example 2, the following compounds are prepared from the indicated starting materials:

17α(dodecyldiethylsilylethynyl)estradiol having a molecular weight of 550.9 from ethynylestradiol and dodecyldiethylchlorosilane.

17α(dioctadecylmethylsilylethynyl)estradiol having a molecular weight of 845.5 from ethynylestradiol and dioctadecylmethylchlorosilane.

17α(cyclohexyldiethylsilylethynyl)estradiol having a molecular weight of 464.8 from ethynyl and cyclohexyldiethylchlorosilane.

17α(tribenzylsilylethynyl)estradiol having a molecular weight of 596.9 from ethynylestradiol and tribenzylchlorosilane.

17α(tolydiethylsilylethynyl)estradiol having a molecular weight of 472.8 from ethynylestradiol and tolyldiethylchlorosilane.

EXAMPLES 22–28

In accordance with the general esterification method recited in Example 5, the following compounds are prepared from the indicated starting materials:

17α(triethylsilylethynyl)estradiol 3-acetate having a molecular weight of 469.7, from 17α(triethylsilylethynyl)estradiol and acetic anhydride.

17α(triethylsilylethynyl)estradiol 3-propionate having a molecular weight of 483.7, from 17α(triethylsilylethynyl)estradiol and propionic anhydride.

17α(triethylsilylethynyl)estradiol 3-butyrate having a molecular weight of 497.7, from 17α(triethylsilylethynyl)estradiol and butyric anhydride.

17α(triethylsilylethynyl)estradiol 3-heptanoate having a molecular weight of 541.8, from 17α(triethylsilylethynyl)estradiol and heptanoic anhydride.

17α(trans-2'-triethylsilylvinyl)estradiol 3-acetate having a molecular weight of 471.7, from 17α(trans-2'-triethylsilylvinyl)estradiol and acetic anhydride.

17α(cis-2'-triethylsilylvinyl)estradiol 3-butyrate having a molecular weight of 499.7, from 17(cis-2'-triethylsilylvinyl)estradiol and butyric anhydride.

The compounds of this invention have utility as antifertility and estrogenic agents, and it has been found that, as compared to ethynylestradiol, they have diminished estrogenic activity when employed at a dosage level giving complete protection against pregnancy. This is a desirable quality since thromboembolism and other undesirable side effects observed clinically are associated with the estrogenic component of the estrogenprogestogen combination. It has also been found that the compounds of the present invention are highly effective in preventing pregnancy either when administered on a cyclic, day-by-day basis or postcoitally.

The compounds of this invention are tested to evaluate their antifertility and estrogenic qualities. The results so obtained are expressed below in the table in terms of relative activity as compared with that of ethynylestradiol. For purposes of this comparison, the latter compound is arbitrarily assigned an activity level of 100 for each of the antifertility and estrogenic functions.

In carrying out the antifertility tests, each compound is administered parenterally (s.c. or l.m.) or orally (by intubation) for 8 consecutive days to adult cycling female rats who have each been caged daily with 2 adult male breeder rats, beginning with the day prior to the first administration of the test compound, and only when insemination has been confirmed. Vaginal smears are obtained each morning and used to confirm insemination, and on the ninth day of the test the females are sacrificed and the number of implantation sites are counted and recorded. The program with each chemical is such that the dosage level is gradually increased, from one 8-day period to the next, until the implantation sites evidencing pregnancy are reduced to zero. When ethynylestradiol is tested in this fashion the minimum dosage effective to prevent pregnancy is approximately 0.1 mg./kg. of body weight per day. If, for example, a given compound in the current test series would require administration at a 1.0 mg./kg. of body weight per day to prevent pregnancy, this compound would be assigned a value of 10.

In making the estrogenic activity tests immature rats 21 days of age are employed. These rats are initially subject to ovariectomy and, starting that day and continuing once daily for 4 days, are subjected to a program wherein the compound under test is administered orally (by intubation) or subcutaneously, as required. At the conclusion of this 4-day administration period vaginal smears are obtained, the rats are sacrificed and the uteri are dissected and weighed. In conducting this test, the compound being evaluated is administered in incremental doses from one series of tests to the next, until an effective dose range is reached. This effective dose range, for a given chemical, is compared to the dose response curve of ethynylestradiol for determination of relative estrogenic potency.

The following table presents data as to the relative antifertility and estrogenic activities of the indicated chemicals based on the assigned activity levels of ethynylestradiol.

TABLE

| Compound | Antifertility activities | Estrogenic activities |
| --- | --- | --- |
| Ethynylestradiol | 100 | 100 |
| 17α(trimethylsilylethynyl)estradiol | 33 | 7 |
| 17α(triethylsilylethynyl)estradiol | 400 | 75 |
| 17α(trans-2'-triethylsilylvinyl)estradiol | 1.3 | 0.04 |
| 17α(1'-triethylsilylvinyl)estradiol | 4 | 0.5 |
| 10α(trans-2'trimethylsilylvinyl)estradiol | 0.5 | 0.2 |
| 17α(1'-trimethylsilylvinyl)estradiol | 2 | 0.4 |
| 17α(cis-2-triethylsilylvinyl)estradiol | 10 | 0.5 |
| 17α(trans-2'-tri-n-propylsilylvinyl)estradiol | 0.5 | 0.05 |
| 17α(1'-tri-n-propylsilylvinyl)estradiol | 2 | 0.5 |
| 17α(tri-n-propylsilylethynyl)estradiol | 200 | 25 |

We claim:

1. Hydrocarbylsilylethynyl and hydrocarbylsilylvinyl derivatives of estradiol having the structure,

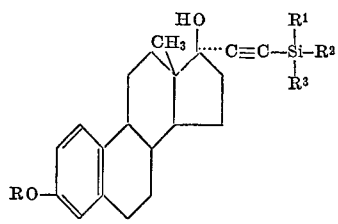

or

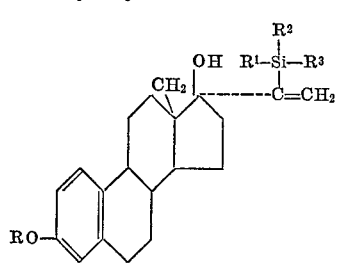

or

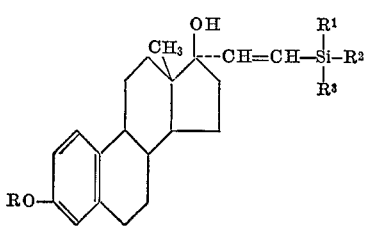

wherein R represents hydrogen, methyl or $C_2$–$C_7$ alkanoyl, and $R^1$, $R^2$, and $R^3$, which may be the same or different, represent groups which can be $C_1$–$C_{18}$ alkyl, cyclohexyl, methallyl, benzyl, phenyl, or tolyl groups.

2. The compound according to claim 1 which is 17α-(trimethylsilylethynyl)estradiol.

3. The compound according to claim 1 which is 17α-(trimethylsilylethynyl)estradiol 3-methyl ether.

4. The compound according to claim 1 which is 17α-(triethylsilylethynyl)estradiol.

5. The compound according to claim 1 which is 17α-tri-n-propylsilylethynyl)estradiol.

6. The compound according to claim 1 which is 17α-(tri-n-butylsilylethynyl)estradiol.

7. The compound according to claim 1 which is 17α-(tri-n-butylsilylethynyl)estradiol 3-acetate.

8. The compound according to claim 1 which is 17α-(triphenylsilylethynyl)estradiol.

9. The compound according to claim 1 which is 17α-(cyclopentamethylenemethylsilylethynyl)estradiol.

10. The compound according to claim 1 which is 17α-(dimethylphenylsilylethynyl)estradiol.

11. The compound according to claim 1 which is 17α-(dimethylallylsilylethynyl)estradiol.

12. The compound according to claim 1 which is 17α-(trans-2'-triethylsilylvinyl)estradiol.

13. The compound according to claim 1 which is 17α-(1'-triethylsilylvinyl)estradiol.

14. The compound according to claim 1 which is 17α-(trans-2'-trimethylsilylvinyl)estradiol.

15. The compound according to claim 1 which is 17α-(1'-trimethylsilylvinyl)estradiol.

16. The compound according to claim 1 which is 17α-(trans-2'-tri-n-propylsilylvinyl)estradiol.

17. The compound according to claim 1 which is 17α-(1'-tri-n-propylsilylvinyl)estradiol.

18. The compound according to claim 1 which is 17α-(trans-2'-tri-n-butylsilylvinyl)estradiol.

19. The compound according to claim 1 which is 17α-(1'-tri-n-butylsilylvinyl)estradiol.

20. The compound according to claim 1 which is 17α-(trans-2'-triphenylsilylvinyl)estradiol.

21. The compound according to claim 1 which is 17α-(1'-triphenylsilylvinyl)estradiol.

22. The compound according to claim 1 which is 17α-(cis-2'-triethylsilylvinyl)estradiol.

23. The compound according to claim 1 which is 17α-(cis-2'-trimethylsilylvinyl)estradiol.

24. The compound according to claim 1 which is 17α-(trans-2'-cyclopentamethylenemethylsilylvinyl)estradiol.

25. The compound according to claim 1 which is 17α-1'-cyclopentamethylenemethylsilylvinyl)estradiol.

References Cited

UNITED STATES PATENTS

| 3,300,523 | 1/1967 | Brown et al. | 260—397.4 |
| 3,303,205 | 2/1967 | Pines | 260—397.5 |
| 3,560,532 | 2/1971 | Cereghetti et al. | 260—397.4 |

HENRY A. FRENCH, Primary Examiner

U.S. Cl. X.R.

260—999

UNITED STATES PATENT OFFICE
CERTIFICATE OF CORRECTION

Patent No. 3,755,382  Dated August 28, 1973

Inventor(s) David F. Crowe and Masato Tanabe

It is certified that error appears in the above-identified patent and that said Letters Patent are hereby corrected as shown below:

Column 4, lines 41 and 42, delete "50 ml. of water and".

Column 6, line 2, delete "122-1260°C." and insert --122-126°C.--.

Column 6, line 14, delete "17 α(trans-'-triethylsilyl-vinyl)estradiol" and insert --17 α(trans-2'-triethylsilylvinyl)estradiol--.

Column 6, line 37, delete "17 α(1-triethylsilylvinyl)" and insert --17 α(1'-triethylsilylvinyl)--.

Column 6, line 50, delete "75.85" and insert --75.08--.

Column 6, line 57, delete "17 α(1'trimethylsilylvinyl)" and insert --17 α(1'-trimethylsilylvinyl)--.

Column 8, line 13, delete "ethynyl" and insert --ethynylestradiol--.

Column 10, line 4, delete "methallyl" and insert --allyl--.

Column 10, line 57, insert --(-- before "1".

Signed and sealed this 12th day of March 1974.

(SEAL)
Attest:

EDWARD M. FLETCHER, JR.
Attesting Officer

C. MARSHALL DANN
Commissioner of Patents